United States Patent [19]

Stovall et al.

[11] 4,125,255
[45] Nov. 14, 1978

[54] ALIGNMENT MECHANISM FOR PROCESSING DOCUMENTS

[75] Inventors: Milton A. Stovall, Camden; Richard L. Swartz, Columbia, both of S.C.

[73] Assignee: Recognition Equipment Incorporated, Dallas, Tex.

[21] Appl. No.: 788,180

[22] Filed: Apr. 18, 1977

[51] Int. Cl.² ............................................. B65H 9/16
[52] U.S. Cl. .................................... 271/251; 271/274
[58] Field of Search ................................ 271/251, 274

[56] References Cited

U.S. PATENT DOCUMENTS

| | | | |
|---|---|---|---|
| 2,124,855 | 7/1938 | Hitchcock | 271/251 |
| 2,190,417 | 2/1940 | Davidson | 271/251 |
| 2,190,418 | 2/1940 | Davidson | 271/251 |
| 3,618,934 | 11/1971 | Germuska | 271/274 |
| 3,908,986 | 9/1975 | Bleau | 271/251 X |

Primary Examiner—Richard A. Schacher
Attorney, Agent, or Firm—John E. Vandigriff; Thomas W. DeMond

[57] ABSTRACT

Alignment mechanism for processing documents having a plurality of rotating rollers extending upward from the floor of a horizontal tray which is provided with a longitudinal edge. The axes of the rollers are positioned at approximately 75° angle with respect to the longitudinal edge. A pluraity of balls are located the longitudinal edge. A plurality of balls are located each roller. The documents pass between the rollers and the balls for moving the documents toward the longitudinal edge and simultaneously toward a read station located adjacent an end of the longitudinal edge. Two pairs of rollers, and upper and lower baffles cooperate to vertically align documents of different thicknesses with respect to the read station.

3 Claims, 3 Drawing Figures

ALIGNMENT MECHANISM FOR PROCESSING DOCUMENTS

BACKGROUND OF THE INVVENTION

1. Field of the Invention

The invention relates to alignment mechanisms and more particularly to alignment mechanisms transporting documents for processing purposes.

2. Description of the Prior Art

In the normal processing of letter mail by the U.S. Postal Service, other postal services, and their patrons much of the mail must be sorted by codes such as ZIP codes or other coding methods useful in subsequent operations on the mail pieces. Traditionally a high proportion of this mail is fed by some conveyor means to a position which is visually accessible to an operator. The operator then reads the code on the face of the individual letters and then keys in data to direct the mailpiece to the appropriate bin in the sorting scheme.

Of late it has become increasingly desirable to perform the sorting operation by means of some automated or mechanized method in order to increase the rate at which sorting can be performed and decrease the manual labor content of the operation.

SUMMARY OF THE INVENTION

The present invention provides means for controlling the orientation of documents such as letters in a stream as they are transported at essentially constant speed in the field of view of some automatic scanning system which reads the ZIP code by some OCR techniques or reads some type of code, such as block code, bar-half-bar code, or other type code providing appropriate data to direct sorting into appropriate bins. It is the purpose of the invention to register the bottom edge of each mail piece to a consistent position in the field of view of the scanner so that the codes imprinted on the face of the envelopes can be read by automatic scanning techniques with a high degree of accuracy.

The present invention includes a tray with a flat horizontal floor. The floor has a plurality of slots with a roller extending upward through each slot. The axes of the rollers are parallel with the floor and form an approximately 75° angle with an upward extending longitudinal edge of the tray. A plurality of balls, which are freely rotating but constrained from horizontal movement, are positioned above the rollers with each roller having at least one balls associated therewith.

The documents are moved by the rollers between the balls and the rollers. The balls are moveable vertically and rest against the rollers when there is not a document present between the roller and its associated balls. Thus, the balls move upward to accommodate different thicknesses of documents which is a condition usually encountered within the postal system. The balls are urged downward by gravity for maintaining the documents in contact with the rollers.

The documents are driven by the rollers toward the longitudinal edge of the tray and toward an end of the longitudinal edge. Because the angle between the rollers and the longitudinal edge is approximately 75° the letter is both moved (or registered) against the edge, then held against the edge, and moved along the edge.

A read station which can be an optical character recognition device is located adjacent to the end of the edge toward which the document is driven by the rotating rollers. Two pairs of rollers are positioned with their axes perpendicular to the longitudinal edge of the tray and parallel to the floor. Each pair of rollers has one roller, the upper, which is not vertically moveable and the other roller, the lower, which is moveable vertically. A plurality of springs, at least one for each pair, urges the lower rollers upward toward its associated upper roller. An upper baffle extends from the upper roller of the pair of rollers receiving the documents from the tray toward the read station which is located between the pairs of rollers. A lower baffle is pivotally connected to the lower roller of both pairs of rollers and moveable vertically therewith. The documents pass between the upper and lower rollers, and the upper and lower baffles. This ensures that the upper surface of the document passes adjacent the read station without regard to the thickness of the document.

A BRIEF DESCRIPTION OF THE DRAWINGS

DESCRIPTION OF THE PREFERRED EMBODIMENT

A conveyer or stacker (not shown) on which the letters or documents are stacked in a horizontal stack moves the stack essentially continuously to a position adjacent to a feeding means and positions the front envelopes in the stack to an orientation of approximately 45° from the vertical for convenience of separating and feeding letters one at a time. The feeding means, employing a vacuum cup picks the first envelope in the stack and separates it from the rest of the stack by grasping it near the right hand edge (in a right hand machine or left hand edge in a left hand machine) and moving it forward away from the stack a distance of approximately one half inch.

When the first letter is separated from the stack and is in the proper position for feeding, the feed tube is actuated to feed the letter sideward to insert the leading edge of the letter into the nip of a pair of power driven take-away rollers (not shown). These rollers transfer the letter into a transition chute (not shown) where the letter is permitted to fall to the horizontal under the influence of gravity while at the same time being transferred through the transition chute. The track roller and upper tension rollers at the output end of the transition chute then transfer the letter into the aligner section 10 of the present invention.

Figure 1:
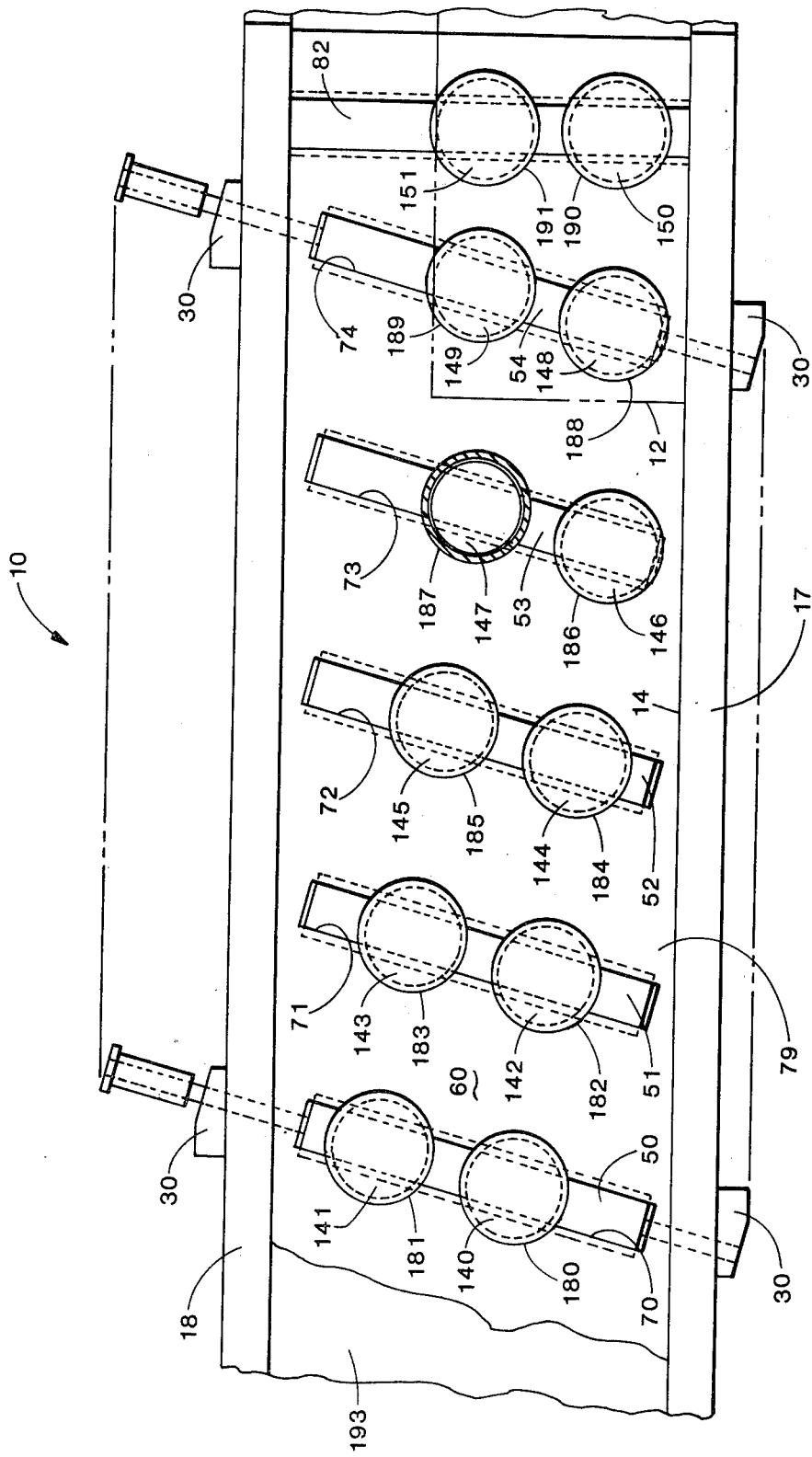
FIG. 1 is a top view of a alignment mechanism constructed according to the present invention with portions cut away to reveal internal details.
Figure 2:
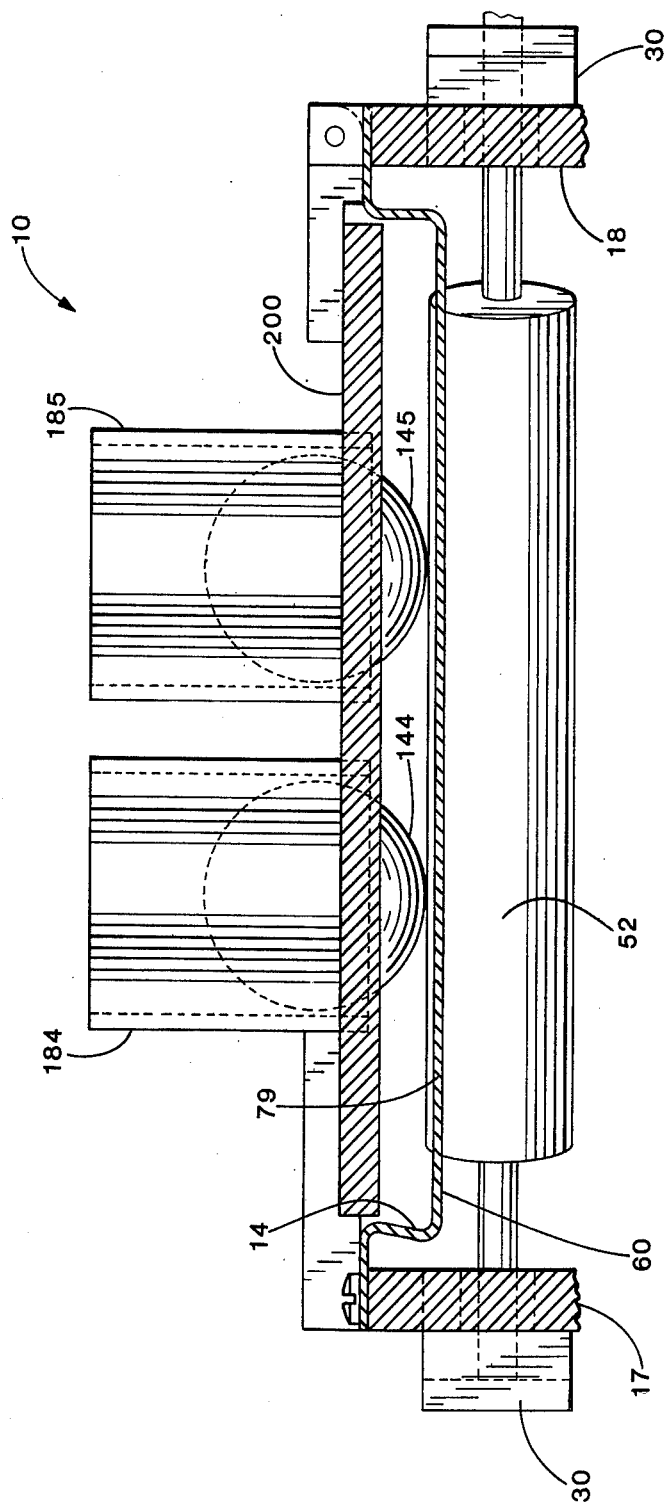
FIG. 2 is front view of a roller and associated ball bearings shown in FIG. 1.

Tranverse aligner section 10 can be understood by referring to FIGS. 1 and 2 and the parts identified by numbers thereon. The aligner consists of the following identified parts working together to perform the function of moving the document or letter 12 while in transit through the aligner from any position away from the front most surface or longitudinal edge 14 (FIG. 2) to a position contiguous to that edge 14 while at the same time reorienting the letter from any orientation with long edges not parallel to its direction of motion to an orientation with the long edges parallel to its direction of motion along the edge 14. Thus, the letter, as it reaches the portion of the edge where the scanning sensor or read station 16 (FIG. 3) is mounted, is in the proper relationship to the scanning sensor to provide accurate reading of the code imprinted on the face of the envelope.

The front and rear track frames 17 and 18 are bolted together and spaced an appropriate distance apart by spacers, threaded rods and nuts (not shown). Along these track frames 17 and 18 at appropriate intervals are mounted bearing housings 30 (only a few are shown) fastened with screws (not shown) so that the bearings 30 are mounted at an angle of 15° more or less to the frames 17 and 18. Supported by these bearings are rollers 50 through 54 which because of the angle of the bearing housings are canted with respect to the longitudinal edge 14 at an angle of 75° more or less. Thus, the axes of the rollers are at less than 90° but more than 45° angle with respect to the edge 14. Surrounding the five, more or less, canted track rollers 50 through 54 is a formed sheet metal tray 60 of which edge 14 is a part and in which are cut clearance slots 70 through 74 in the floor 79 of tray 60. The upper portion of the rollers 50 through 54, respectively, are exposed to any letter 12 which is transferred into the aligner section, so that as they rotate they act upon the letter to drive it along the tray tangent to the top roller surface, while at the same time imparting motion to the letter toward the front most inner vertical surface or upwardly extending longitudinal edge 14 of the tray 60.

In addition, a roller 82 is attached perpendicular to the longitudinal edge 14 and extends upward through tray 60. The axes of all of the rollers are parallel to the floor 79 of the tray 60.

The front most inner vertical surface or edge 14 of the tray 60 is formed in such a way that as the rollers drive the letters longitudinally along the tray and sideward toward the edge longitudinal 14, the letter is restrained from lifting as it strikes the front most inner surface or edge 14 of the tray 60 but is rather directed downward along its edge, and thus is registered accurately along that edge of the tray.

To assist in the forceful driving of the letters through the aligner section and forward toward the front most inner surface or edge 14 of the tray 60, the aligner section employs a multiplicity of balls 140 through 151 accurately spherical and highly polished in positions above along the axis of the canted rollers 50 through 54, and 82 such that they impact downward forces on the letters where they contact the rollers, thereby increasing the frictional driving force applied to the letters by the canted rollers. Each of the balls 140 through 151 is housed within a cylinder, 180 through 191, respectively which permits the balls to move vertically but not horizontally. The sphericity of the balls 140 through 151 allows them to rotate in any direction to accommodate the varying instantaneous movements of the letters as they are acted on by the canted rollers 50 through 54. Two balls are associated with each roller.

The balls are retained in position by means of an upper plate 200 (FIG. 2) mounted at a distance above the canted rollers to permit the passage of the thickest letter intended to be processed in the aligner section. Cylinders 180 through 191 are permanently attached into the plate 200 horizontally positionally constraining the individual balls but allowing each to rotate about any horizontal axis through its center and to move vertically for conforming to the varying and instantaneous motions of the letters.

Figure 3:
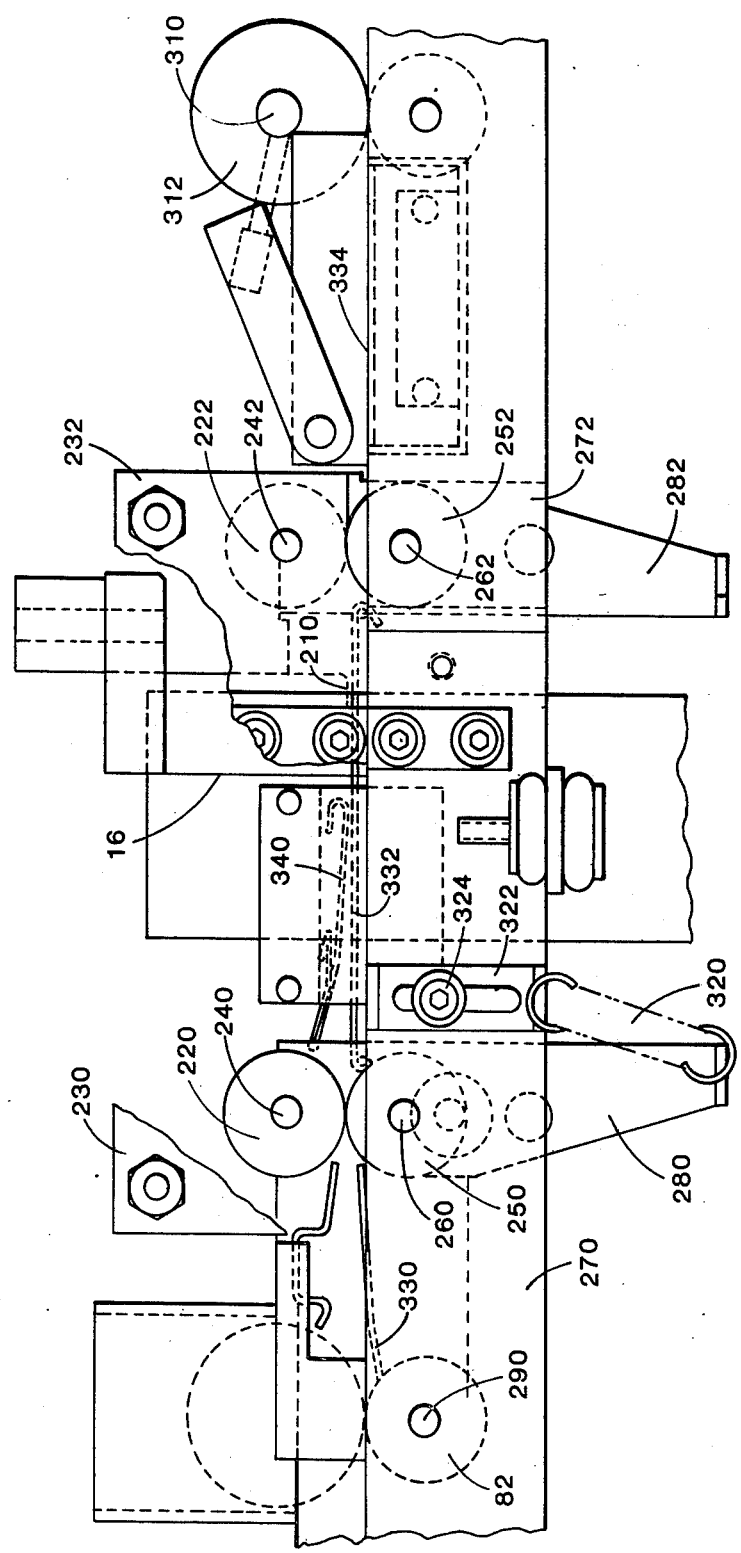
FIG. 3 is side view of a read station and associated apparatus.

As shown in FIG. 3, the second stage of alignment is required to space the upper surface of each document a constant distance from the active end 210 of the read station 16. This function is performed as the letter is being transported at essentially constant speed along the track and adjacent to the active end of the scanning sensor.

Two upper rollers 220 and 222 are supported between two upper side plates front and back (only one plate for each 230 and 232, respectively, are shown) by means of two anti-friction bearings 240 and 242, respectively. The two upper rollers 200 and 222 are thus fixed in position but are driven through pulleys and O-ring belts (not shown) from a main lineshaft (not shown) to drive the letters forcefully and at essentially constant speed through the read head section. Rollers 50 through 54 and 82 could be driven in a similar manner. Mounted below the two fixed drive rollers 220 and 222 are two moveably supported lower pressure rollers 250 and 252, respectively, mounted in bearings 260 and 262, respectively, contained in housings 270 and 272, respectively and, attached to two pivot arms each (only 2 of which 280 and 282 are shown). Two of the pivot arms (only 280 is shown) are supported by bushings which are free to turn on the shaft 290, the axes of which is perpendicular to the longitudinal edge 14 and parallel to the axis of of the last adjacent roller 82 in the aligner section. The other two pivot arms (only 282 is shown) are supported by bushings (not shown) which are free to turn on the shaft 310 of the first adjacent roller following roller 312 in the transfer section. All four of these pivot arms are acted on by springs (only one 320 is shown) which have one end loop attached to the lower extremity of the pivot arms and the other end loop attached to a slidably adjustable bracket 322 which can be adjusted for appropriate spring tension and then clamped in position by means of clamping screw 324.

Lower baffles 330, 332, and 334 are pivotally connected on the pivot arms so that they all move vertically as the rollers 250 and 252 move vertically to accommodate the passage of varying thickness of letters through the read head station. A fixed upper baffle 340 is attached to the side plates (only one of which 230 is shown) to guide the letters or documents beneath the read station. The baffles 330, 332 and 334 act to contain the letter and forcefully move and urge it up to a position adjacent to the read head 16 so that the top surfaces of the letters are contiguous to and at essentially a constant distance from the active surface 210 of the read head 16 thus assuring that the code imprinted on the top surface of the envelope can be accurately scanned and read.

Having described the invention in connection with certain specific embodiments thereof, it is to be understood that further modifications may now suggest themselves to those skilled in the art. It is intended to cover all such modifications as fall in the scope of the appended claims.

What is claimed is:

1. Alignment mechanism for document processing which transversely and vertically aligns documents to be read, said documents being transported serially at a constant rate comprising:
a horizontal tray having a flat floor and a longitudinal edge extending upward from said floor;
a plurality of rotating rollers with their axes at an approximately 75° angle to said longitudinal edge and parallel to said floor, each roller extending upward through a slot in said floor and slightly beyond said floor, said rollers urging said documents toward said longitudinal edge and along said edge to an end thereof;

a plurality of freely rotating balls horizontally constrained and urged downward, each ball being located above and resting against one of said plurality of rollers with at least one ball associated with each roller for allowing said documents to pass between each roller and its associated ball;

a read station for reading characters printed on said documents located adjacent said end of said longitudinal edge;

a first and second vertically movable rollers located on both sides of said reading station for guiding said documents past said read station, said first roller being located between said plurality of rollers and said read station;

a third and fourth rotating roller located above said first and second rollers, respectively, and moving said documents past said read station;

a stationary upper baffle extending from said first roller toward said read station directing each document beneath said read station;

a movable lower baffle pivotally connected between said first and second rollers for holding each document against said read station; and a plurality of springs urging said first and second rollers upward to squeeze each document there between.

2. Alignment mechanism as set forth in claim 1 wherein two balls are associated with each roller.

3. Alignment mechanism for vertically aligning documents being transported serially adjacent a read station for reading alphanumeric characters printed thereon comprising:

a first pair of rollers receiving said documents for moving said documents toward said read station;

a second pair of rollers receiving said documents after said documents pass said read station for moving said documents away from said read station;

said first and second pairs of rollers each having a vertically fixed upper roller and vertically movable lower roller located beneath its associated upper roller, said lower roller being urged upward to squeeze said document against said upper roller, an upper baffle extending horizontally from adjacent the upper roller of said first pair of rollers toward said read station to guide said document toward said read station; and and a lower baffle pivotally connected to and extending between the lower rollers of said first and second pairs of rollers for moving vertically with said lower rollers to guide said document from said first pair of rollers to said second pair of rollers beneath said read station with its upper surface against said read station.

* * * * *